H. BARNETT.
BUMPER.
APPLICATION FILED DEC. 18, 1918.

1,302,279.

Patented Apr. 29, 1919.

Witnesses

Inventor
H. Barnett
By Victor J. Evans
Attorney

UNITED STATES PATENT OFFICE.

HERBERT BARNETT, OF KINGSTON, ONTARIO, CANADA.

BUMPER.

1,302,279.  Specification of Letters Patent.  Patented Apr. 29, 1919.

Application filed December 18, 1918. Serial No. 267,282.

*To all whom it may concern:*

Be it known that I, HERBERT BARNETT, a subject of the King of Great Britain, residing at Kingston, Ontario, Canada, have invented new and useful Improvements in Bumpers, of which the following is a specification.

This invention relates to new and useful improvements in bumpers or fenders for automobiles and the principal object of the invention is to provide the fender with a plurality of springs whereby the shock of the fender striking an object will be absorbed and not transmitted to the vehicle.

Another object of the invention is to provide a device of this character which is simple and durable in construction, reliable and efficient in operation and one which can be manufactured and placed upon the market at a minimum cost.

The invention also consists in certain other features of construction and in the combination and arrangement of the several parts, to be hereinafter fully described, illustrated in the accompanying drawings and specifically pointed out in the appended claims.

In describing my invention in detail, reference will be had to the accompanying drawings wherein like characters denote like or corresponding parts throughout the several views, and in which:—

Figure 1:
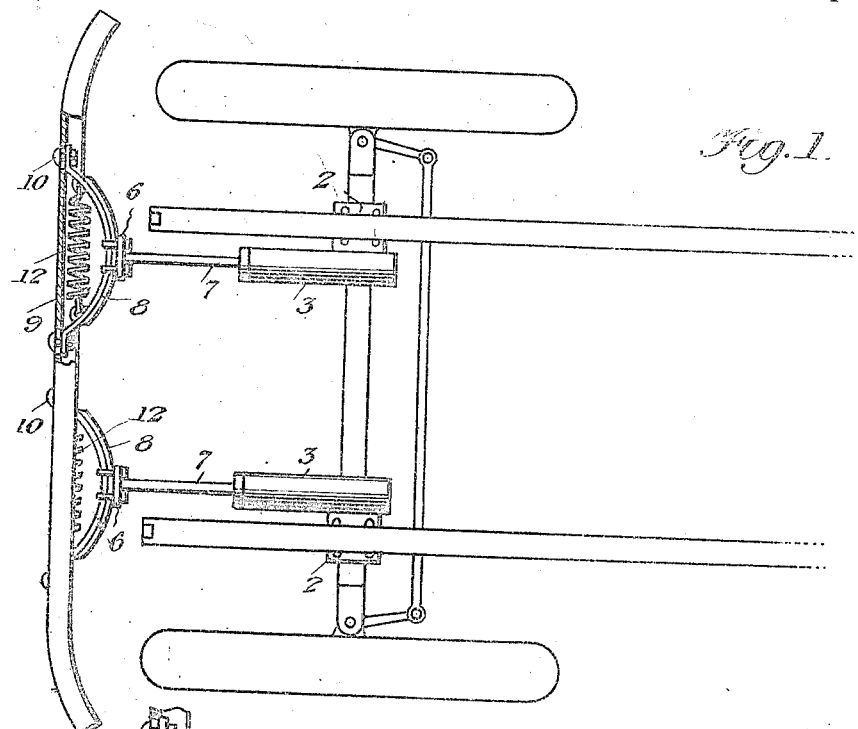
Figure 1 is a plan view of my improved bumper placed on the forward end of an automobile.
Figure 2:
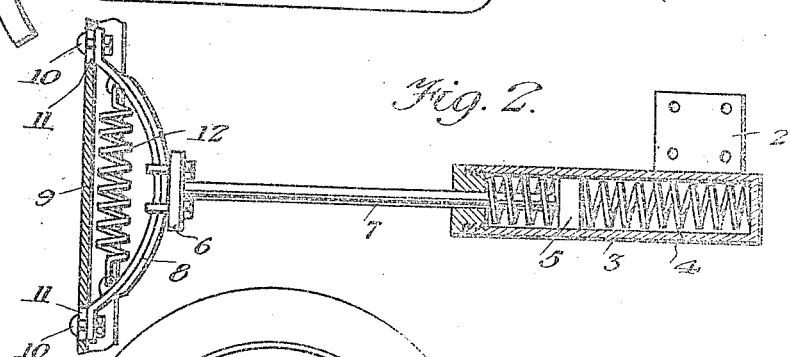
Fig. 2 is an enlarged detailed view partly in sections showing the manner of connecting the leaf spring to the fender.
Figure 3:
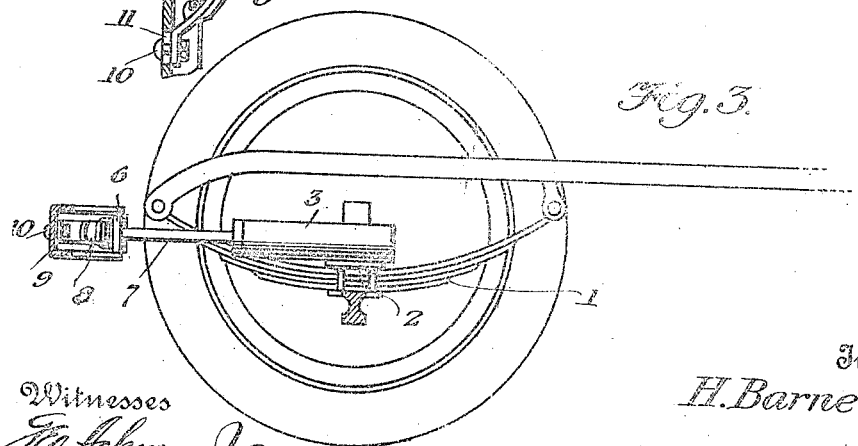
Fig. 3 is a side view of an automobile with the bumper shown in vertical section.

In these views the front springs of the automobile are shown at 1 and my fender is secured to these springs by the plates 2. The plates may be clamped to the springs in any suitable way. 3 represents a casing secured to each plate and containing a spiral spring 4. 5 is a piston sliding in said casing and acting against said spring. 6 indicates a bracket carried by the piston rod 7 and this bracket is suitably clamped to a curved or semi-elliptical spring 8 having its ends bolted to the bumper 9. The bolts 10 pass through slots 11 in said bumper so that the bumper will have a certain amount of movement on the springs. I place a spiral spring 12 in the curve of each of the springs 8 with the ends of said springs 12 suitably connected to said spring 8. These spiral springs will resist the spreading movement of the curved springs. The bumper may be made of channel iron or of any other desired shape.

It will thus be seen that I utilize a plurality of springs to resist the rearward movement of the bumper so that the danger of injuring the automobile by collision is reduced to a minimum.

It is thought from the foregoing description that the advantages and novel features of my invention will be readily apparent.

I desire it to be understood that I may make changes in the construction and in the combination and arrangement of the several parts, provided that such changes fall within the scope of the appended claims.

What I claim is:

1. A fender for automobiles comprising a casing, a coiled spring therein, a piston in the casing acting against said spring, a rod connected with said piston, a curved spring connected with said rod, a bumper connected with said curved spring and a spiral spring connected with the curved spring for resisting spreading movement of the same.

2. A fender for automobiles comprising a pair of casings, a coiled spring in each casing, a piston in each casing, a rod on each piston, a pair of curved springs connected with said rods, a bumper adjustably secured to said curved springs and a spiral spring connected with the inner sides of each of the curved springs.

In testimony whereof I affix my signature.

HERBERT BARNETT.